(12) United States Patent
McKean et al.

(10) Patent No.: US 7,194,578 B2
(45) Date of Patent: Mar. 20, 2007

(54) ONBOARD INDICATOR

(75) Inventors: Brian McKean, Longmont, CO (US); Mohamad El-Batal, Westminster, CO (US)

(73) Assignee: LSI Logic Corporation, Milpitas, CA (US)

( * ) Notice: Subject to any disclaimer, the term of this patent is extended or adjusted under 35 U.S.C. 154(b) by 510 days.

(21) Appl. No.: 10/731,191

(22) Filed: Dec. 8, 2003

(65) Prior Publication Data

US 2005/0144508 A1    Jun. 30, 2005

(51) Int. Cl.
*G06F 3/00* (2006.01)

(52) U.S. Cl. .................. 711/114; 711/115; 710/15; 710/18

(58) Field of Classification Search ................ 711/115, 711/114; 235/492; 714/1, 25, 42; 710/15, 710/18
See application file for complete search history.

(56) References Cited

U.S. PATENT DOCUMENTS 5,966,510 A * 10/1999 Carbonneau et al. ......... 714/44
2005/0086397 A1 * 4/2005 Huffman et al. .............. 710/15

* cited by examiner

*Primary Examiner*—Jack A. Lane
(74) *Attorney, Agent, or Firm*—Cochran Freund & Young LLC

(57) ABSTRACT

A system and method for indicating the service status of serviceable elements of a subassembly stores the service status in a memory using a host controller. When the subassembly is removed from the host controller, the memory may be accessed using a second circuit and separate power supply, and indicators may be illuminated to indicate the service status of the elements.

21 Claims, 3 Drawing Sheets

ONBOARD INDICATOR

BACKGROUND OF THE INVENTION a. Field of the Invention

The present invention pertains generally to serviceable electronic equipment and specifically to indicators useful for identifying partially disassembled serviceable components.

b. Description of the Background

In many electronic systems, a subassembly may be removed from an enclosure to provide access so that various replaceable or serviceable elements may be exchanged. When the subassembly is removed from the enclosure and disconnected from a power source and a host controller, a failed item may be difficult to identify for servicing. Further, a report or other documentation may need to accompany the subassembly to inform a service technician which item requires replacement or service. Such documentation may be misplaced and confusing.

In an example of a disk based storage system, such as a RAID system, each individual disk drive may be a serviceable element. In some RAID systems, several disk drives may be mounted in a subassembly that is mounted inside an enclosure, such as a standalone enclosure or a rack mounted enclosure. When a service technician removes a multi-disk subassembly to replace one or more of the disk drives, the technician needs to identify the proper disk drive for replacement. The technician may receive a report from a host controller that indicates the specific drive to be serviced, but such a report may be difficult to interpret.

The correct determination of the replaceable element is important for proper servicing. In a RAID example, if the technician replaces the incorrect disk drive, data stored on that disk drive may be lost.

When the service has been completed, a host controller may need to perform initialization, testing, or configuration of newly replaced elements. In a RAID example, a replaced disk drive may be rebuilt with data from other drives. In such an example, downtime may also be reduced by indicating to the host controller which replaceable elements have been serviced so that the host controller may assume that the non-replaced elements contain good data.

It would therefore be advantageous to provide a system and method for indicating the status of serviceable elements on a subassembly when the subassembly is disconnected from a host device. It would be further advantageous to provide such a system that was simple, low cost, and provided some feedback when the service was complete.

SUMMARY OF THE INVENTION

The present invention overcomes the disadvantages and limitations of previous solutions by providing a system and method for indicating the service status of serviceable elements of a subassembly by storing the service status in a memory using a host controller, removing the subassembly from the host controller, accessing the memory using a second circuit and separate power supply, and indicating the service status of the elements.

An embodiment of the present invention includes a method for indicating the status of a plurality of serviceable items on a subassembly comprising: determining the status of the plurality of the serviceable items using a host controller in communication with the subassembly; storing the status in a memory location within the subassembly; removing the subassembly from communication with the host controller; providing a power source to the subassembly; querying the memory location within the subassembly; and indicating the status of the plurality of the serviceable items based on the query.

Another embodiment of the present invention includes a system for indicating the status of a plurality of serviceable items on a subassembly comprising: a host controller in communication with the subassembly and adapted to determine the status of the plurality of serviceable items; a memory location on the subassembly and adapted to store the status of the plurality of serviceable items, the memory location further adapted to be written by the host controller; a circuit contained within the subassembly adapted to read the memory and indicate the status of the plurality of serviceable items; and a power source adapted to power the circuit.

Yet another embodiment of the present invention includes a system for indicating the status of a plurality of serviceable items on a subassembly comprising: a first means in communication with the subassembly and adapted to determine the status of the plurality of serviceable items; a second means on the subassembly and adapted to store the status of the plurality of serviceable items, the second means further adapted to communicate with the first means; a third means contained within the subassembly adapted to read the second means and indicate the status of the plurality of serviceable items; and a fourth means for powering the third means.

Advantages of the present invention include simply and efficiently communicating the status of serviceable elements on a subassembly that is removed from a host controller. Information necessary for the service of the subassembly is kept onboard the subassembly and may be provided by placing illuminated indicators near components that need to be replaced. In so doing, confusion is minimized and proper service may be performed in the least amount of time.

DETAILED DESCRIPTION OF THE INVENTION

Figure 1:
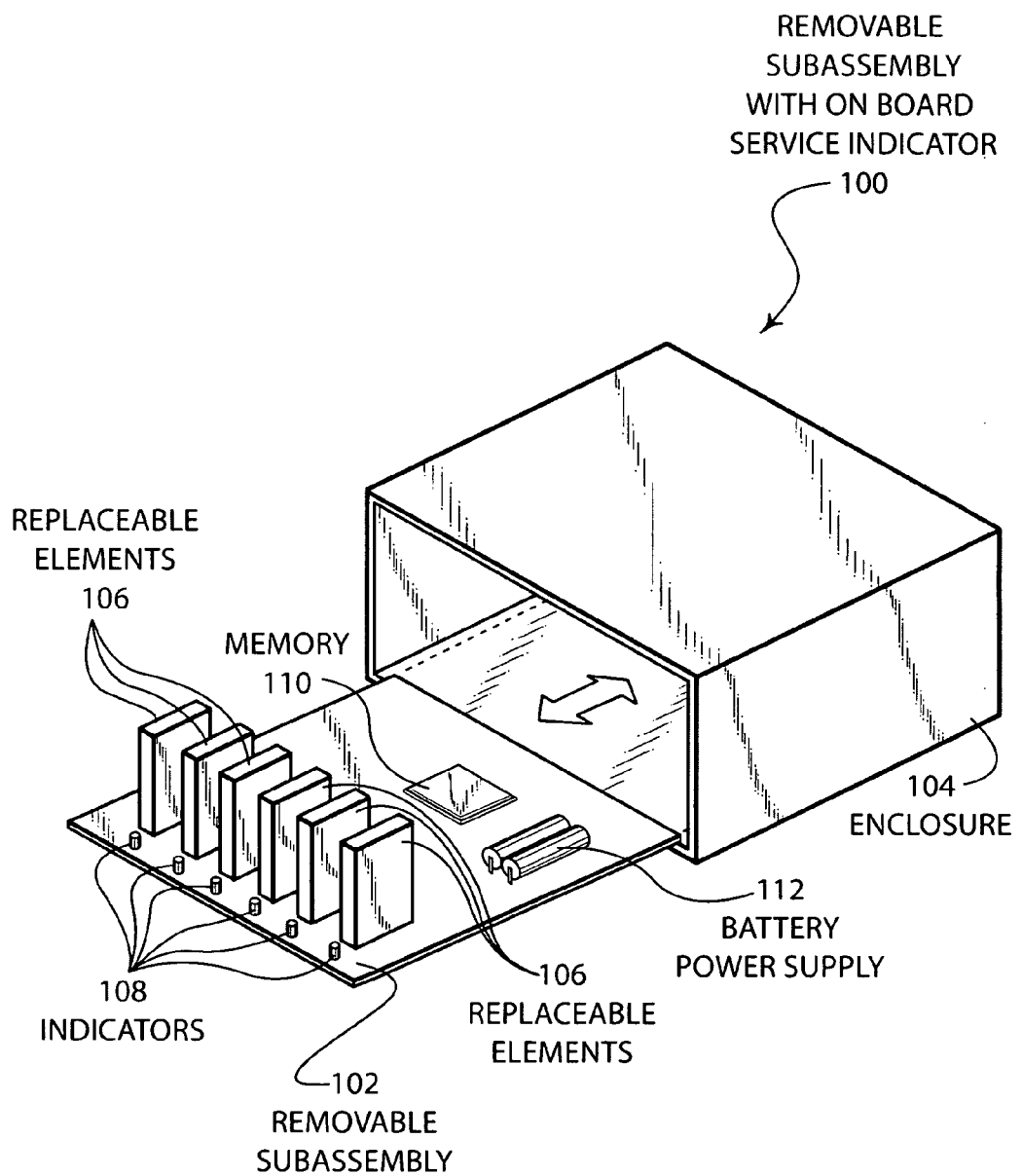
FIG. 1 is a schematic representation of an embodiment of the present invention showing a removable subassembly with an onboard service indicator.

FIG. 1 illustrates an embodiment 100 of the present invention showing a removable subassembly with an onboard service indicator. The removable subassembly 102 is normally housed in the enclosure 104 during normal operation. The removable subassembly 102 contains several replaceable elements 106. If one of the elements 106 is to be serviced, the indicators 108 may be illuminated to indicate which of the multiple elements 106 requires servicing. A circuit contained in the subassembly 102 may query the memory 110 using the battery power supply 112.

The embodiment 100 may contain a subassembly 102 of an electronic system, such as a storage system or other electronic subassembly that contains serviceable elements 106. When the subassembly 102 is removed from the enclosure 104, communication between a host controller and the subassembly is cut off. However, the non-volatile memory 110 may contain information that is useful in the service and repair of the subassembly 102. A circuit on board the subassembly 102 may use a power supply 112 to query the memory 110 and illuminate indicators 108 to show the technician which of the elements 108 is to be replaced or serviced.

The memory 110 may be updated and maintained by a host controller. The host controller may monitor the replaceable elements 106 in a normal operating environment. When the host controller is reading and writing to the memory 110, the on board detection circuit may be disconnected or non-functional. The on board circuit may be activated by a service technician once the removable subassembly 102 is removed from the enclosure 104.

In some embodiments, the memory 110 may be updated by the on board circuit when service is performed. In such a manner, a service technician may cause the memory 110 to be updated to indicate that service was performed. A switch, keyboard, or other input mechanism may be used to update the memory 110, which may in turn be queried by the host controller when the subassembly 102 is replaced.

The embodiment 100 may be particularly useful in a storage system that contains several replaceable disk drives that may be mounted on a removable subassembly 102. Such a system may be a RAID system wherein multiple disk drives are used in a redundant fashion. In many such embodiments, a failed disk drive may be placed off line and flagged to be replaced. When a removable subassembly 102 contains many disk drives as replaceable elements 106, it may be difficult for the technician to determine the precise disk drive that must be replaced. Those drives that are in proper working order may contain valuable data, while those that are failed must be replaced so that the system may regain full operating capacity. If a technician replaces the improper drive, valuable data may be lost. By placing the indicators 108 near each of the replaceable elements 106, the precise element that needs service may be identified with ease, minimizing the chance for error.

In some cases, the identifiers 108 may be multicolored lights or LED's that indicate the status of the elements 106. For example, a green LED may indicate that the element does not require service. A red LED may indicate that service needs to be performed. A yellow LED may indicate that service may be necessary in the future or that the element is functioning in a reduced performance state. In other embodiments, a display, such as a numerical LED or LCD display, may be used to communicate status codes or other information as may be desired.

In some embodiments, the on board circuit may be capable of detecting if a serviceable element 106 had indeed been removed and replaced. For example, the on board circuit may have a detection switch that is opened when the device is removed. When the removable element is removed, the detection switch is activated, signaling to the on board circuit that the element has been removed. In another example, the on board circuit may be capable of querying the element that has been replaced to determine if it is different from the previous element. In such an example, the on board circuit may be capable of powering up the device, querying specific information from the device, analyzing the information, and storing an updated status for the device into the memory 110.

The on board circuit may be powered by an on board power source, such as a battery, or may have power supplied by an off board power supply, such as a separate power source. In some embodiments, an on board battery power supply may be a rechargeable battery that is kept charged while the removable subassembly is in the normal operating mode. Any power supply may be used by those skilled in the arts, including batteries, solar power, off-board power supplies, or any other electrical power source.

Figure 2:
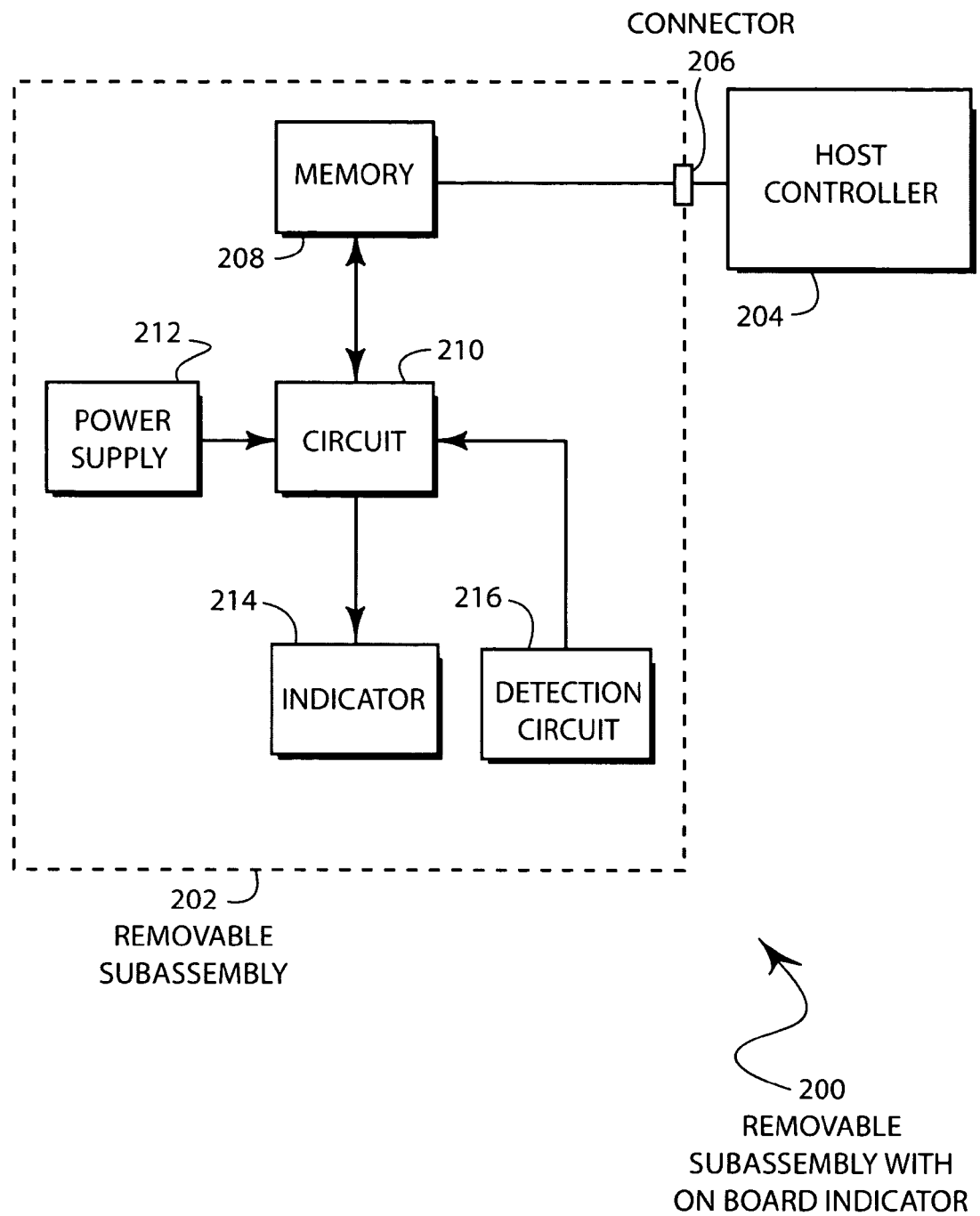
FIG. 2 is a block diagram of a removable subassembly shown in FIG. 1 hereof.

FIG. 2 is a block diagram of a removable subassembly shown in FIG. 1 hereof. Embodiment 200 has a removable subassembly having an onboard indicator. The removable subassembly 202 is connected to a host controller 204 through a connector 206. The host controller 204 is connected directly to memory 208. Memory 208 is also connected to the on board circuit 210, which is connected to a power supply 212, an indicator 214, and an optional detection circuit 216.

The host controller 204 may communicate directly with the memory 208 while the subassembly 202 is in the normal operating state and the connector 206 is engaged. In some embodiments, the removable subassembly may be engaged to the connector 206 through a blind mate connector system. In such a system, the engagement of the removable subassembly into a card cage or enclosure may engage the connector 206, thus enabling the host controller 204 to query, write, and change the memory 208.

The detection circuit 216 may be capable of actively or passively detecting if service had been performed on one or more of the replaceable elements. In an embodiment with an active detection mechanism, the circuit may query the replaceable element or may have sensors that indicate if one of the elements has been replaced. In an embodiment with a passive detection mechanism, the service technician may activate a switch, enter a code, or otherwise provide input so that the circuit 210 may update the memory 208 with a change of status.

Figure 3:
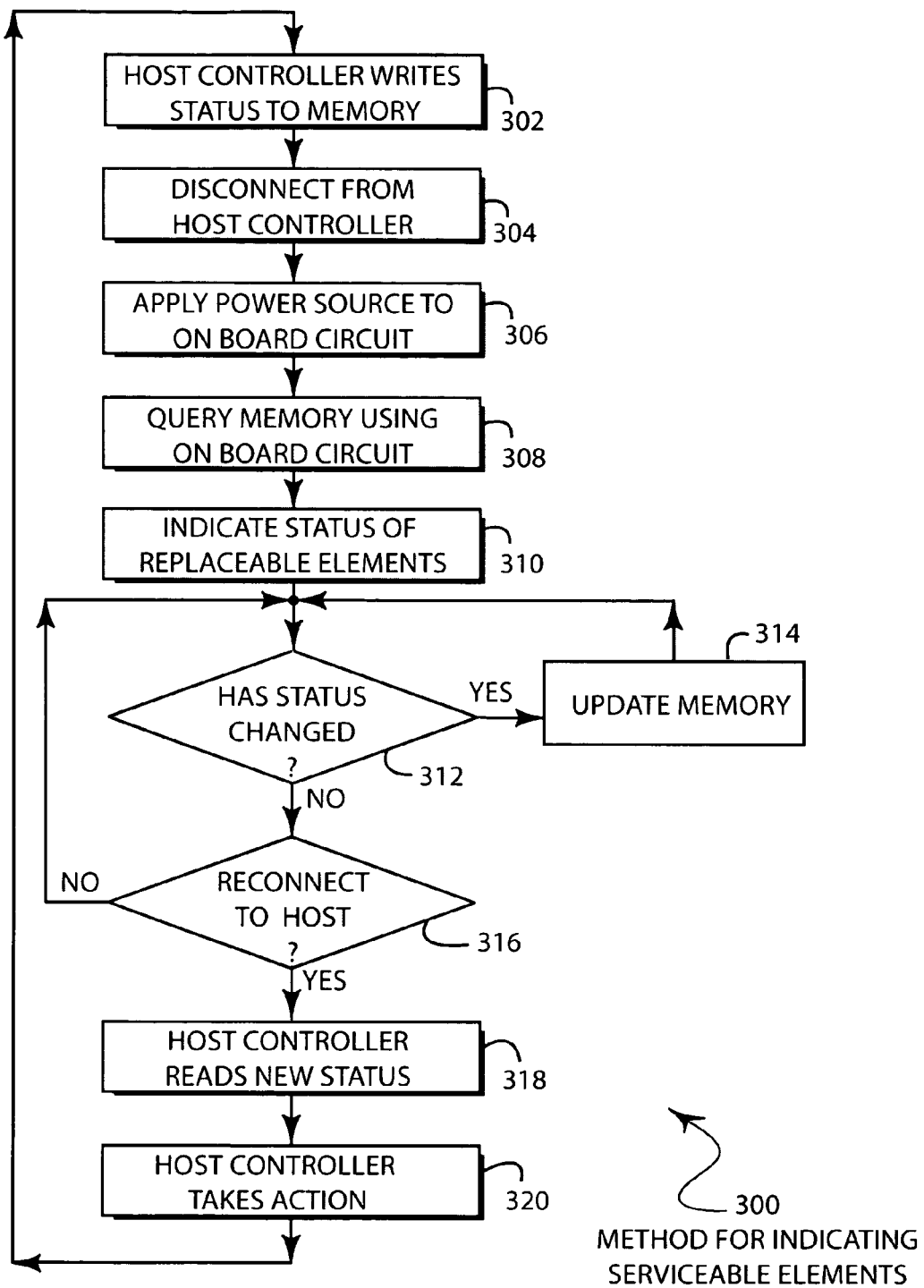
FIG. 3 is a flow diagram illustrating an embodiment of a method for indicating serviceable elements.

FIG. 3 is a flow diagram illustration of an embodiment 300 of the method of the present invention showing a method for indicating serviceable elements. The host controller first writes the status to memory in block 302. Next, the subassembly is disconnected from the host controller in block 304. Power is applied to the on board circuit in block 306. The on board memory is queried in block 308 and the status of the replaceable elements is displayed on the indicators in block 310. If the status of the replaceable element has changed in block 312, the memory is updated in block 314. If the status has not changed in block 312, and the subassembly has not been reconnected to the host in block 316, the loop continues with block 312. If the subassembly has been reconnected in block 316, the host controller reads the updated status in block 318 and takes appropriate action in block 320. The process returns to block 302.

The embodiment 300 illustrates a method by which data may be written to a removable subassembly, used to assist service and repair, and updated for use when the subassembly is reinstalled. The repair or service status of various components on the subassembly may be maintained by the host controller when the host controller is operating the subassembly. At the point that a service technician removes the subassembly, the data stored on board may be queried and displayed using an indicator. When the service is performed, the status of the replaceable element is changed in block 312, and the data stored may be updated.

When the subassembly is reconnected to the host computer, the on board data may be used to take action in block 320. Such action may be to perform initialization or configuration on the replaced elements. For example, if the replaceable element is a storage device used in a RAID system or other type of storage system, the host controller may be required to build data onto a freshly replaced storage device in accordance with the storage scheme used by the controller. The host controller may used the updated status data stored on board the replaceable subassembly to determine which replaceable elements have been changed, modified, or replaced.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for indicating the status of at least one serviceable item on a subassembly comprising:
    determining said status of said at least one serviceable item using a host controller in communication with said subassembly;
    storing said status in a memory location within said subassembly;
    removing said subassembly from communication with said host controller;
    querying said memory location within said subassembly such that said status of said at least one serviceable items is indicated; and powering said subassembly with a power source.

2. The method of claim 1 wherein said at least one serviceable item comprises a plurality of disk drives.

3. The method of claim 2 wherein said host controller is a RAID controller.

4. The method of claim 1 wherein said power source comprises a battery.

5. The method of claim 4 wherein said battery is rechargeable.

6. The method of claim 1 wherein said indicating is performed by illuminating an LED.

7. The method of claim 1 further comprising:
    replacing at least one of said at least one serviceable item based on said indicator;
    changing said status in said memory location;
    connecting said subassembly to said host controller; and
    reading said status from said memory location by said host controller.

8. A system for indicating the status of a plurality of serviceable items on a subassembly comprising:
    a host controller in communication with said subassembly and adapted to determine said status of said plurality of serviceable items;
    a memory location on said subassembly and adapted to store said status of said at least one serviceable item, said memory location further adapted to be written by said host controller;
    a circuit contained within said subassembly adapted to read said memory and indicate said status of said plurality of serviceable items; and
    a power source adapted to power said circuit.

9. The system of claim 8 wherein said serviceable items comprises a plurality of disk drives.

10. The system of claim 9 wherein said host controller is a RAID controller.

11. The system of claim 8 wherein said power source comprises a battery.

12. The system of claim 11 wherein said battery is rechargeable.

13. The system of claim 8 further comprising a plurality of LED indicators.

14. The system of claim 8 wherein said circuit is further adapted to update said status in said memory location and said host controller is further adapted to read said memory location when said subassembly is reconnected to said host controller.

15. A system for indicating the status of at least one serviceable item on a subassembly comprising:
    a first means in communication with said subassembly and adapted to determine said status of said at least one serviceable item;
    a second means on said subassembly and adapted to store said status of said at least one serviceable item, said second means further adapted to communicate with said first means;
    a third means contained within said subassembly and adapted to read said second means and indicate said status of said plurality of serviceable items; and
    a fourth means for powering said third means.

16. The system of claim 15 wherein said serviceable items comprises a plurality of disk drives.

17. The system of claim 16 wherein said first means comprises a RAID controller.

18. The system of claim 15 wherein said fourth means comprises a battery.

19. The system of claim 18 wherein said battery is rechargeable.

20. The system of claim 15 further comprising a plurality of LED indicators.

21. The system of claim 15 wherein said third means is further adapted to update said status in said second means and said first means is further adapted to read said second means when said subassembly is connected to said first means.

* * * * *